No. 874,613. PATENTED DEC. 24, 1907.
J. A. McCOLM.
NAIL HOLDER AND SET.
APPLICATION FILED JUNE 8, 1907.
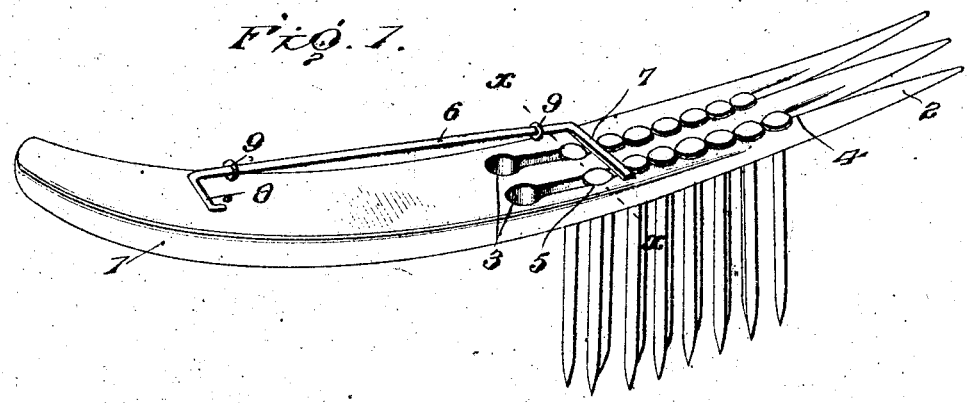
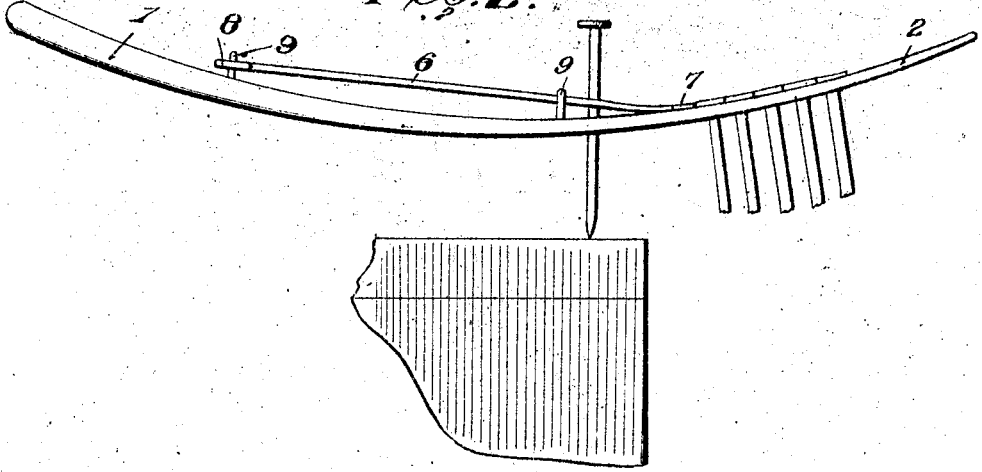
Witnesses
Inventor
John A. McColm
By
Attorneys

UNITED STATES PATENT OFFICE.

JOHN A. McCOLM, OF NEW PLYMOUTH, IDAHO.

NAIL HOLDER AND SET.

No. 874,613.  Specification of Letters Patent.  Patented Dec. 24, 1907.

Application filed June 8, 1907. Serial No. 377,995.

*To all whom it may concern:*

Be it known that I, JOHN A. McCOLM, citizen of the United States, residing at New Plymouth, in the county of Canyon and State of Idaho, have invented certain new and useful Improvements in Nail Holders and Sets, of which the following is a specification.

The present invention facilitates the construction where a number of nails are to be driven and obviates the practice of holding a number of nails in reserve in the mouth with the consequent ill results, besides preventing injury to the fingers when sticking the nails.

The invention provides a novel holder for receiving a number of nails, and a separator whereby the nails to be driven are separated from the remainder so as not to be in the way.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a device embodying the invention. Fig. 2 is a side elevation thereof. Fig. 3 is a transverse section on the line x—x of Fig. 1.

Corresponding and like parts are referred to in the following description and indicated in all the views of the drawings by the same reference characters.

The holder proper comprises a hand piece 1 and a series of tines 2, and is preferably curved throughout its length for convenience of handling and manipulating and to prevent displacement of the nails as well as to facilitate picking up the nails when filling the holder. The tines 2 are tapered at their extremities and are spaced apart a distance according to the size of the nails for which the holder is constructed. The device is long and comparatively narrow and thin and tapers from a middle point towards each end. Openings 3 are provided at the inner ends of the slots or spaces 4 formed between the tines 2 and are of a size to admit of the heads of the nails passing therethrough. Depressions 5 are formed in the sides of the tines a short distance from the openings 3 and form seats in which the heads of the nails drop so as to come below the upper surface of the device. The openings 3 may be designated as clearance openings, whereas the depressions 5 merging into the slots or spaces 4 provide set openings in which the nails to be driven are positioned to be set by tapping the same a light blow preliminary to their detachment from the holder by passing through the clearance openings 3.

The separator consists of a bar 6, blade 7 and finger piece 8 and is mounted in bearings 9 at one edge of the holder, said bearings being in the form of eyes. The parts 6, 7 and 8 are portions of a wire bent into the shape substantially as shown. The blade 7 rests upon the upper side of the holder and extends across the slots or spaces 4 and is adapted to engage with the heads of the innermost nails to properly space them from the set and clearance openings. When the separator is turned upon the bar 6 as an axis to throw the finger piece 8 and blade 7 outward, the innermost nails move towards the set openings and drop in the depressions 5, after which the separator is turned to bring the blade 7 in the path of the heads of the nails and upon pushing the separator forward or towards the points of the tines 2, the nails in advance of those seated in the set openings 5 are moved forward so as to be out of the way, thereby providing for placing the nails in the set openings in position and sticking the same by a light blow, after which the holder may be moved forward to bring the heads of the nails in register with the clearance openings and upon lifting the holder the nails previously set pass through clearance openings 3 and may be driven home by properly directed blows thereon in the usual manner.

The holder may be charged or supplied with a number of nails by passing points of the tines through a box, key or other receptacle containing the nails in bulk, said holder being manipulated by a sweeping movement, the nails being caught up by the points of the tines passing beneath the heads thereof, and the nails sliding upon the tines back into the nail receiving slots or spaces 4. After the holder has been filled or supplied with a number of nails, the separator is turned aside to permit the innermost nails to enter and drop into the set openings 5, after which the separator is turned back into normal position and pushed forward, with the result that the nails in advance of those seated in the set openings 5 are moved out of the way, thereby admitting of the nails in the set openings being placed in proper position to be struck by striking the same a light blow, and subsequently moving the holder to admit of the nails passing thereover through the clearance opening 3, after which the nails may be driven home. It will thus be understood that the device prevents the handling of each nail and the holding of the same when in position for driving, and as a result work is greatly facilitated since the nails may be quickly driven one after the other and the holder may be expeditiously refilled after being emptied.

It is noted that the device is held in one hand by means of the hand piece 1, the thumb serving to manipulate the separator. The hammer or other driving tool is held in the opposite hand. The nails may be driven one at a time or two may be struck at once. During the interval of driving the nails, the holder may be manipulated so as to have other nails in position, thereby admitting of driving the nails without any loss of time, such as usually required by picking up the nail and holding the same until struck by the hammer. The device besides facilitating the work enables a greater amount of work to be accomplished in a given time with less fatigue and exertion

Having thus described the invention, what is claimed as new is:

1. A nail holder comprising spaced tines tapered at their ends and having a set opening and a clearance opening in the length of the space formed between said tines, and a separator mounted to receive both an axial and a longitudinal movement and adapted to sweep over said set opening.

2. A nail holder and set, comprising tines longitudinally curved and tapered at their ends, and having a set opening and a clearance opening in the length of the space formed between the tines.

3. A nail holder and set longitudinally curved throughout its length and comprising a hand piece and spaced tines, the latter tapered at their ends and having a set opening and clearance opening in the length of the space formed between them, and a separator mounted at one side of the holder and comprising a blade to rest upon the tines, and a finger piece, said separator having both an axial and a longitudinal movement.

In testimony whereof I affix my signature in presence of two witnesses.

JOHN A. McCOLM. [L. S.]

Witnesses:
ERNST F. MEYER,
A. R. INGALLS.